C. F. CUNO.
AUTOMATIC SWITCH FOR CIGAR LIGHTERS, &c.
APPLICATION FILED SEPT. 4, 1919.
1,342,015.
Patented June 1, 1920.
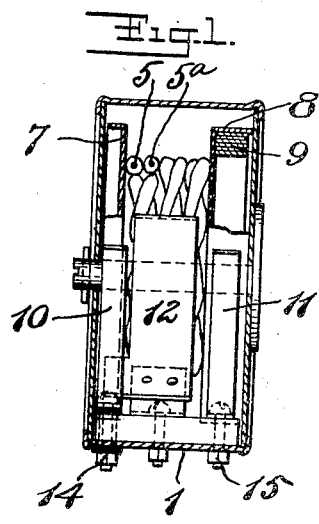
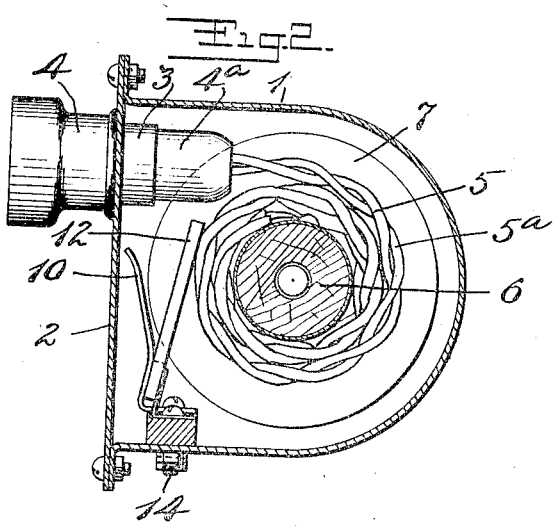
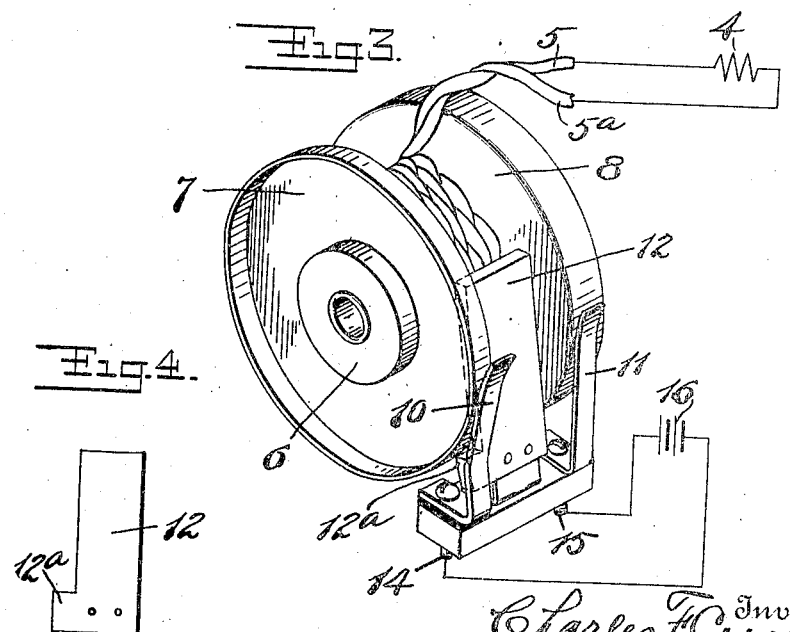
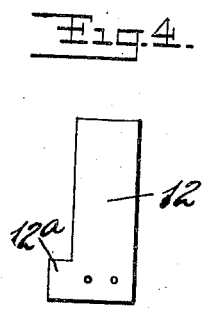
Charles F. Cuno, Inventor
By his Attorney

UNITED STATES PATENT OFFICE.

CHARLES F. CUNO, OF MERIDEN, CONNECTICUT, ASSIGNOR TO CUNO ENGINEERING CORPORATION, OF MERIDEN, CONNECTICUT, A CORPORATION OF CONNECTICUT.

AUTOMATIC SWITCH FOR CIGAR-LIGHTERS, &c.

1,342,015.   Specification of Letters Patent.   Patented June 1, 1920.

Application filed September 4, 1919. Serial No. 321,539.

*To all whom it may concern:*

Be it known that I, CHARLES F. CUNO, a citizen of the United States of America, residing at Meriden, Connecticut, have invented a new and useful Automatic Switch for Cigar-Lighters, &c., of which the following is a specification.

My invention relates to electric lighting devices and the like, of the type in which the device is carried by a long flexible cable conductor which is wound on a reel and arranged so that the said device may be drawn up close to the reel when out of use, or may be drawn out to an extended position for use. The reel is preferably controlled by a spring so as to normally draw the device toward it. The device carried by said flexible cable may be a lamp for illuminating purpose, or a piece of resistance wire for lighting cigars or cigarettes, or it may be an electrical device useful for any purpose.

For convenience, I shall describe my invention herein as applied to a cigar lighting device, although by the selection of the term "lighting device" I do not wish to be understood as limiting the scope of appended claims to any particular form of electrical device.

The present invention includes many advantages, for example: In the present device I provide means for causing the cable to be neatly wound on the reel when the latter is being rewound by its spring. I also provide an effective means for closing the circuit which means maintains the contact surface bright and efficient. The construction is also such that danger of short circuiting is reduced to a minimum. I also construct the parts so that after the cable has been partially unwound from the reel the circuit will be closed automatically; and correspondingly when the cable is partially rewound on the reel the circuit will be automatically opened, thus, if the lighting device should not happen to be drawn back to its full extent by the reel and if the cable should not be fully rewound the circuit will remain open so that there will be no accidental drain on the battery. This is of particular value when the invention is employed for cigar lighting purposes since it not infrequently happens that when the lighting device is released from the hand, the cable is not fully wound on the reel and the circuit therefore remains closed, thereby unduly draining the battery. By my present invention this danger is wholly avoided by so constructing the various parts that the circuit is broken before the cable is fully wound on the reel. As illustrative of a device which is open to the danger above pointed out, I may refer to the construction set forth in my own co-pending application Serial Number 267,599 in which it will be seen the circuit is not broken until its cable is fully wound on the reel. By my present invention the various parts are simplified and may be economically produced and assembled.

In the accompanying drawings:

Figure 1, is a transverse cross-section of my invention, certain parts being broken away and certain other parts being shown in elevation.

Fig. 2, is the longitudinal cross-section of the apparatus, certain parts being shown in elevation with the circuit open.

Fig. 3, is the perspective view of certain parts.

Fig. 4, is a view of a detail.

1 represents the main body of the housing. 2 represents the front plate of said housing. This plate is provided with a passage bordered by a flange 3 which forms a socket designed to support the lighting device when the latter is in its fully retracted position. 4 represents the body of a lighting device said body having a short shank $4^a$ which fits easily within the socket 3, so as to hold the outer end of said device neatly against the front plate. The cable includes the two conductors $5-5^a$ of flexible insulated wire. The reel construction, preferably includes an insulating hub 6 on which is mounted two metallic head flanges 7 and 8 said flanges being insulated from each other by said hub. The conductor wire 5 is in electrical connection with one flange while the conductor wire $5^a$ is electrically connected to the other flange. In the form shown the head flange 8 is so shaped as to furnish the housing for the winding spring 9. 10 is a contact member carried by the housing 1 and insulated therefrom. This contact is carried by the housing in such a position that it will make a brush engagement with the outer portion of the flange 7, hence, as reel is revolved the rubbing engagement of brush 10 on flange 7 will maintain the surface bright and efficient. 11 is a brush designed to bear against periphery of the flange 8 so as to make a rubbing contact therewith. This brush is likewise carried by the housing 1 but need not be insulated therefrom. 12 is a shoe mounted on the housing 1 independently of and preferably between the two brushes 10 and 11. This mounting is such that this shoe will normally move freely between the flanges 7 and 8 and toward the hub 6. The shoe 12 has no electrical function, but functions mechanically to open the circuit by throwing off the brush 10 when the cable has been partially wound up on the reel. The shoe 12 also performs the function of causing the cable to reel neatly, since as the cable is wound it presses lightly upon the several spiral convolutions. When the cable has built up sufficiently on the hub the shoe 12 will engage and lift the brush 10 so as to break the circuit. After this the device 4 will engage the housing 1 and stop the further winding of the cable. The mechanical operation between the shoe 12 and the contact brush 10 may be modified in a great variety of ways but in this particular instance the shoe 12 is provided with the lug or shoulder 12ª which projects freely under the brush 10. It is essential that the shoe should be so insulated that it will not cause a short circuit when it engages the brush 10. This insulation may be easily effected by making the shoe of some suitable insulating material which may have a smooth surface that will not injure the cable covering.

In Fig. 3, 16 represents a battery as a suitable source of power. This battery is electrically connected with the brushes 10 and 11 through suitable binding posts 14 and 15 respectively. Obviously since the flange 7 is insulated from the housing 1 and can only be put in circuit by the brush 10 the use of the second brush 11 may be dispensed with because ordinarily the flange 8 is electrically grounded on the housing 1. By providing a second brush contact arranged to bear on a movable portion of the flange 8 the rubbing contact serves to keep the parts bright and affords an efficient electrical connection at all times.

I claim:—

1. In an apparatus of the character described, a main support, a reel carried thereby, a cable comprising two flexible insulated conductor wires mounted on said reel, and arranged to be wound thereon, a spring operating to turn the wheel in one direction to wind the cable thereon, a current consuming device at the outer end of said cable and electrically connected with said wires, a switch within the housing to open and close a circuit through said wires, a switch operating device comprising means arranged to be engaged by the several convolutions of the cable windings on the reel and moved thereby as said convolutions increase or diminish.

2. In a device of the character described, a main support, a reel mounted thereon, said reel having two flanges, one of said flanges being made of conducting material, a cable comprising two flexible conducting wires, said cable being carried by said reel, one of said conductors being electrically connected with said conducting flange, a contact for making and breaking the circuit, said contact being carried by said main support and making rubbing contact with the conducting flange of the reel, means bearing on that portion of the cable wound on the reel and movable thereby as the several convolutions increase or decrease, said means operating to electrically disconnect said contact from the conducting portion of the reel and break the circuit when a sufficient number of convolutions have been built up thereon.

3. In a device of the character described, a main support, a reel mounted thereon, said reel having two flanges, one of said flanges being made of conducting material, a cable comprising two flexible conducting wires, said cable being carried by said reel, one of said conductors being electrically connected with said conducting flange, a contact for making and breaking the circuit, said contact being carried by said main support and making rubbing contact with the conducting flange of the reel, means bearing on that portion of the cable wound on the reel and movable thereby as the several convolutions increase or decrease, said means operating to electrically disconnect said contact from the conducting portion of the reel and break the circuit when a sufficient number of convolutions have been built up thereon, said means comprising a shoe carried by the support mechanically and electrically independent of said contact.

4. In a device of the character described, a main support, a reel mounted thereon, said reel having two flanges, one of said flanges being made of conducting material, a cable comprising two flexible conducting wires, said cable being carried by said reel, one of said conductors being electrically connected with said conducting flange, a contact for making and breaking the circuit, said contact being carried by said main support and making rubbing contact with the conducting flange of the reel, means bearing on that portion of the cable wound on the reel and movable thereby as the several convolutions increase or decrease, said means operating to electrically disconnect said contact from the conducting portion of the reel and break the circuit when a sufficient number of convolutions have been built up thereon, said means comprising a shoe carried by the support mechanically and electrically independent of said contact, said shoe having an extension arranged to engage and disengage said contact.

5. In an apparatus of the character described, a housing, a reel carried thereby, a cable composed of two flexible insulated wires secured to and arranged to wind on said reel, a spring operating to turn the reel to wind the cable thereon, a current consuming device at the outer end of said cable, a contact for making and breaking the circuit through said conductors and current consuming device, said contact being carried within said housing and means carried within said housing independently of said contact and operating to move the contact to open the circuit when the cable is partially wound on the reel.

6. In an apparatus of the character described, a main support, a reel carried thereby, a cable composed of two flexible insulated wires secured to and arranged to wind on said reel, a spring operating to turn the reel to wind the cable thereon, a current consuming device at the outer end of said cable, a contact for making and breaking the circuit through said conductors and current consuming device, said contact being carried by said support and means carried by said support independently of said contact and operating to move the contact to open the circuit when the cable is partially wound on the reel, said means comprising a shoe arranged to bear lightly on the several convolutions of the cable windings on the reel and operating to cause the same to build up evenly thereon.

7. In an apparatus of the character described, a reel having a hub of insulating material and having two hub flanges of conducting material insulated from each other by said hub, a cable comprising two flexible insulated wires secured respectively to said flanges, a current consuming device carried by said cable at its outer end and in series with said wires, a source of current conductors leading therefrom to said flanges and making engagement therewith by contact devices which respectively make rubbing engagement with the said flanges, a shoe arranged to bear toward the hub of said reel and upon the cable convolutions thereon, whereby said shoe will be moved as the number of convolutions increase and decrease and a connection between said shoe and one of said contacts whereby when said cable has been partially wound on said reel said shoe will engage and move one of said contacts to break the circuit from the source of power to the current consuming device and whereby when said cable has been partially unwound from said reel, said contact may be operated to close said circuit.

8. In an apparatus of the character described, a main support, a reel carried thereby and a coil spring for winding the same in one direction, a flexible cable carried by the reel, a current consuming device carried at the outer end of the cable, a circuit closer in the circuit in series with said current consuming device, and means independent of said circuit closer and movable by that part of the cable actually wound upon the reel to control said circuit closer.

9. In an apparatus of the character described, a main support, a reel carried thereby and a coil spring for winding the same in one direction, a flexible cable carried by the reel, a current consuming device carried at the outer end of the cable, a circuit closer in the circuit in series with said current consuming device, means independent of said circuit closer and movable by that part of the cable actually wound upon the reel to control said circuit closer, said means operating to hold the circuit closer in the open circuit position until said current consuming device has been entirely removed from said support, and also operating to open said circuit before said current consuming device has reached said support on the rewinding of the cable.

CHARLES F. CUNO.